United States Patent [19]

Kriech et al.

[11] Patent Number: 4,874,432

[45] Date of Patent: Oct. 17, 1989

[54] MULTIGRADE ASPHALT CEMENT PRODUCT AND PROCESS

[75] Inventors: Anthony J. Kriech; Herbert L. Wissel, both of Indianapolis, Ind.

[73] Assignee: Asphalt Materials, Inc., Indianapolis, Ind.

[21] Appl. No.: 211,775

[22] Filed: Jun. 27, 1988

[51] Int. Cl.$^4$ ............................................. C08L 95/00
[52] U.S. Cl. ................................. 106/273.1; 106/232; 106/267; 106/281.1; 252/311.5
[58] Field of Search ................... 106/232, 269, 273 R, 106/277, 281 R, 273.1, 281.1; 252/311.5

[56] References Cited

U.S. PATENT DOCUMENTS

| | | | |
|---|---|---|---|
| 1,969,904 | 6/1934 | Sadler | 106/269 |
| 2,268,122 | 10/1941 | Kokatnur | 106/269 |
| 2,385,817 | 10/1945 | Laliberte | 44/7 |
| 2,394,907 | 2/1946 | Gallay | 252/41 |
| 2,855,319 | 10/1958 | McConnaughay | 106/123 |
| 2,888,402 | 5/1959 | Nelson | 252/36 |
| 3,556,827 | 1/1971 | McConnaughay | 106/232 |
| 3,904,428 | 9/1975 | McConnaughay | 106/278 |
| 4,433,084 | 2/1984 | Ostermeyer | 524/62 |
| 4,479,827 | 11/1984 | Ward | 106/269 |

FOREIGN PATENT DOCUMENTS

| | | |
|---|---|---|
| 488086 | 6/1946 | Belgium . |
| 2192985 | 2/1974 | France . |
| 404939 | 1/1934 | United Kingdom . |
| 1393732 | 7/1975 | United Kingdom . |

Primary Examiner—Prince E. Willis
Assistant Examiner—Helene Kirschner
Attorney, Agent, or Firm—Baker & Daniels

[57] ABSTRACT

A gelled asphalt cement having improved properties over conventional asphalt cement, including reduced temperature susceptibility and lower rate of age hardening is disclosed. This multigrade asphalt cement is produced by gelling a liquefied asphalt material. This is accomplished by saponifying in the liquefied asphalt, substantially free of water, at least one fatty acid and at least one resin acid with an alkali metal base, or by adding the already saponified product to the liquefied asphalt. The resulting gelled asphalt cement is utilized in conventional processes in road, roofing and specialty applications. The asphalt cement may be prepapred and applied using conventional hot-mix asphalt processes in existing hot-mix equipment, standard roofing application equipment and specialty asphalt application equipment.

49 Claims, 3 Drawing Sheets

MULTIGRADE ASPHALT CEMENT PRODUCT AND PROCESS

This invention relates to a novel multigrade asphalt cement and to a process for its production. It relates also to use of this novel product as an advantageous substitute for conventional asphalt cements in road and roofing construction and asphalt cement specialties, where reduced temperature susceptibility and decreased rate of age hardening are among the important qualities sought.

BACKGROUND

Asphalt Products and Processes

Pavements of asphalt compositions account for over 90 percent of the paving in the United States. Natural asphalts obtained from lake beds were utilized as early as 1874. Later, rock asphalt deposits were found in some southern and western states which were ground, placed and rolled to form pavement surfaces. However, since the early 1900's, asphalts produced in the process of refining petroleum have dominated both paving and roofing applications.

Asphalt is a dark brown to black, highly viscous material containing bitumens as the principal constituent and is found in varying proportions in most crude petroleums. The asphaltic residuum from petroleum refining, substantially freed of lighter overhead fractions, is commonly called "asphalt."

Paving asphalts are classified as asphalt cement, cutback asphalt and asphalt emulsions. Asphalt cement is of first interest here, although reference to asphalt emulsions and cutback asphalt is appropriate for perspective.

Asphalt cement is an asphalt having properties suited to road or roofing applications and specialty products. For road construction, asphalt is heated to a free-flowing consistency and mixed with aggregate heated approximately to the same temperature (usually 250°–350° F.) and placed on a prepared surface, compacted and cured to produce asphaltic concrete. In the long history of asphalt paving, the hot-mix process of mixing asphalt cement and aggregate has remained the process of choice as offering the most favorable balance of cost and quality. The hot-mix process brings heated, liquefied asphalt cement into contact with heated aggregate to produce a coated aggregate ready for laydown and compaction.

Asphalt cements used for paving are graded according to three distinct parameters: viscosity, viscosity after aging, and penetration. The most common grading system in the United States is based on viscosity, measured in poises at 140° F. (AASHTO M-226). (AASHTO is the designation of the American Association of State Highway and Transportation Officials.) Thus, asphalt cement having a viscosity of 250 poises at 140° F. carries the designation AC-2.5 and is considered a "soft" asphalt. At the other extreme, asphalt cement having a viscosity of 4,000 poises at 140° F. is known as AC-40 and is considered a "hard" asphalt. In between are asphalts designated AC-5, AC-10, AC-20 and AC-30, similarly related to their respective viscosities. In addition, AC-50 has come into use in certain areas of hot climates and AC-1 has been used in colder climates. The standard asphalt grades are tabulated and discussed in "Principles of Construction of Hot-Mix Asphalt Pavements", The Asphalt Institute, Manual Series No. 22 (MS-22), January 1983, page 14.

Some western states have adopted a grading system based on viscosities after aging. This system is intended to reflect more accurately the viscosity characteristics of the pavement after it has been in place. The test simulates aging in the asphalt by accelerating oxidation of a thin film of asphalt at 140° F. (AASHTO M-226). Results are reported, for example, as AR-10 for a viscosity of 1,000 poises, considered a "soft" asphalt, and AR-160 for a viscosity of 16,000 poises, considered a "hard" asphalt. This grading system is discussed in the aforementioned publication at page 15.

Asphalts may also be graded by standard penetration tests (AASHTO M-20). In these tests, the distance a standard needle bearing a specific load penetrates the asphalt in a given time at 77° F. indicates the hardness or softness of the asphalt. This test is discussed in the aforementioned publication at page 16.

For roofing application, asphalt cement is used in the construction of built-up roofs, shingles and saturants in asphalt roll-roofing. Asphalt cement used in built-up roofs is graded by softening point according to ASTM D312. (ASTM is the designation of the American Society for Testing Materials.) A Type I asphalt, which has a low softening point, is considered a soft asphalt. Type IV roofing asphalt has a high softening point and is considered a hard asphalt. These and intermediate grades are based on the susceptibility of the asphalt to flow at stated roof temperatures and slopes. Built-up roofs are constructed by rolling out asphalt-saturated felts, followed by mopping asphalt cement thereon. This process is repeated several times to produce a waterproofed, built-up roof.

There are other specialty applications for asphalt cement including, for example, joint and crack fillers, recycling agents and waterproofing and dampproofing, which have various requirements according to the intended use.

*Cutback asphalt* is used where the asphalt is desired to be liquefied at temperatures lower than those normally employed with asphalt cement or without emulsifying (see below). Cutbacks are commonly applied as spray applications. They are prepared by dissolving asphalt in a petroleum solvent, such as naphtha, kerosene or fuel oil. Both spray and cold-mix applications involving cutbacks raise environmental and safety problems through release of the solvent to the atmosphere. Also, in the energy crisis of the 1970's, the use of petroleum solvents for this purpose was contrary to conservation measures then imposed, which has resulted in a substantial reduction in cutback usage today.

Asphalt emulsions normally employ no solvents for their preparation, although cutback may be used as the asphalt component (these are normally water-in-oil emulsions). The asphalt flux is liquefied by heating, and globules of asphalt are dispersed in water and milled with a surfactant to produce a stable oil-in-water emulsion. Asphalt emulsions can be one of several types, which include anionic, cationic and nonionic, depending on the surfactant used to make the emulsion. Emulsions are used in the sealing of existing roads by applying a thin film of the asphalt emulsion to the road surface, followed by a covering of aggregate to provide a waterproof road. Asphalt emulsions can also be used for mixing with aggregate in place on the roadbed or, through a cold pug-mill process, with aggregate which is then distributed by a aver on the road. Emulsions are usually associated with cold-mix processes; when used as hot-mix, lower temperatures are usually employed as compared with conventional hot-mix processes.

Asphalt emulsions can be used in the hot-mix process to produce asphaltic concrete, but inherent manufacturing difficulties have conferred general preference on utilizing asphalt cement. Some of these problems associated with asphalt emulsions in the hot-mix process are discussed below.

In batch hot-mix plants, venting of the water vapor released on heating the emulsion (normally containing about 30% water by weight) sometimes occurs with explosive force where the aggregate is brought to a relatively high temperature, creating safety and environmental problems. In the continuous drum hot-mix plants, the short mixing time is sometimes insufficient to afford adequate release of water. In both hot-mix manufacturing processes, there is a substantial additional amount of energy required to evaporate the water contained in the emulsion. These oil-in-water emulsions are subject to freezing if stored at sufficiently low temperatures, with consequent premature breaking of the emulsion. Should the emulsions for some reason be overheated, water can be prematurely lost and the emulsion inverted, causing potentially serious problems in handling and resulting in the loss of the use of the product.

Most important from the standpoint of quality is the need to remove water as quickly and completely as possible from the emulsion residue adhering to the aggregate. The water phase of the emulsion contributes inevitably to a high water content in the asphaltic concrete at laydown, and the rate of subsequent evaporation can be influenced by environmental conditions. Thus, there is uncertainty in both the rate and extent of drying in the curing stage of asphaltic concrete laid from asphalt emulsions, with accompanying prospects for variability in important characteristics at any given point in the curing process.

Asphalt emulsions which have been used in the hot-mix process include a class of anionic emulsions called "High float" emulsions. The preparation of these emulsions has long followed established procedures in which the emulsion is stabilized by in situ saponification of organic acids, usually present as tall oil. An asphalt with improved residue properties is produced after the removal of water in the hot-mix process.

For example, U.S. Pat. No. 2,855,319 describes an emulsion in which tall oil is saponified by sodium hydroxide to yield a tall oil soap which serves as the emulsifying agent that is said to confer improved properties on the emulsion residue of the cured asphaltic concrete. U.S. Pat. No. 3,904,428 similarly describes an asphalt emulsion in which, for example, tall oil saponified with sodium hydroxide in the presence of substantial amounts of water is milled with the asphalt cement in a particular temperature range to produce a viscous jelly-like mass containing higher than usual amounts of asphalt. The higher asphalt content is said to lessen the tendency of the asphalt to drain from the wet aggregate and yields a more complete coating.

U.S. Pat. No. 4,433,084 describes high-float emulsion processes in which tall oil is first mixed with asphalt pretreated with various modifiers that affect the properties of the asphalt but do not influence the breaking of the emulsion. Also disclosed is a process in which the emulsifier comprising, for example, tall oil reacted with caustic in water solution, is blended with the asphalt. Ratios of emulsifier components may be varied to accommodate varying compositions of asphalt.

A publication of the Tall Oil Products Division of the Pulp Chemicals Associations, "Tall Oil And Its Uses" (F. W. Dodge Company, 1965), emphasizes the importance of surfactants in the emulsion to displace water on the aggregate and to facilitate binding of the asphalt cement thereto. For this purpose, it describes the use of tall oil fatty acids as emulsifying agents in fluidizing asphalt for road applications.

A general review of hot-mix and cold-mix paving processes is found in "Highway Engineering," Wright & Paquette, 4th Edition (John Wiley & Sons, 1979). A more current review of the hot-mix process appears in "Principles of Construction of Hot-Mix Asphalt Pavements", The Asphalt Institute, Manual Series No. 22 (MS-22), January 1983, to which earlier reference was made. For a review of cold-mix processes using asphalt emulsion, see "A Basic Asphalt Emulsion Manual," The Asphalt Institute, Manual Series No. 19 (MS-19), March 1979.

The saponification reaction has been applied in the solidification of normally liquid hydrocarbons, such as gasolines, to facilitate their safe handling and use. For example, U.S. Pat. No. 2,385,817 discloses the solidification of "normally liquid hydrocarbons" by the formation in situ of metallic soap obtained from the saponification of a mixture of stearic acid and rosin with sodium hydroxide and a small amount of anhydrous methyl alcohol. The alcohol is said to "expedite" the reaction. The "liquid hydrocarbons" are gasolines and other petroleum distillates that are readily flammable and are intended for use as combustible fuels. As such, they are cuts considerably lighter in the petroleum refining process than the asphaltic residuum.

Similarly, soap greases, likewise based on lighter petroleum cuts, have been described, for example, by Lockhart, *American Lubricants* (Chemical Publishing Company, 1927), page 163 et seq. and in U.S. Pat. No. 3,098,823. It has been recognized, not surprisingly, that water is an undesirable ingredient in a grease. For example, in U.S. Pat. No. 2,394,907, a grease is prepared by suspending sodium hydroxide in "a nonreactive liquid medium", such as mineral oil, milling the sodium hydroxide therein and saponifying a fatty acid in the absence of added water. Heating the mixture to a "saponification temperature" is said to initiate the reaction, producing undesired water as a by-product, which then must be removed.

In U.S. Pat. No. 2,888,402, a similar reaction is described but one utilizing a metal hydroxide having water of hydration which is released on heating nd which, it may be supposed, initiates the saponification reaction. Lithium hydroxide, specifically alluded to as the source of water, initiates a first stage saponification, followed by a second stage in which other metal hydroxides are employed.

Despite the long history and extensive use of greases in which organogels were produced by in situ saponification, the arts utilizing asphalts never translated and adopted grease technology to achieve the substantial benefits of gel formation in asphalt materials. Instead, application of asphalt to road, roofing construction and specialty asphalt applications have remained until the present invention the technological province of conventional asphalt cement and, to a lesser extent, of cutback and emulsion processes.

Property Considerations In Asphalt Cement

Currently, for paving applications, asphalt, cement must be selected with care so that the asphaltic concrete will not soften unduly at higher temperatures or crack at lower temperatures. The necessity for this selection has led to use of softer grades of asphalt in northern or colder climates and harder grades of asphalt in southern or warmer climates. However, in many climates the pavements are exposed to extremes of both high and low temperature, leading to compromises in asphalt selection, with no particular grade of asphalt being completely suited over the entire range of climatic temperatures.

Thus, the temperature susceptibility of an asphalt cement in asphaltic concrete applications is of first importance. The asphalt must retain structural integrity at high temperatures without becoming unduly stiff and cracking at low temperatures. However, these properties must also persist in the asphalt pavement over many cycles of temperature changes, freezing and thawing and constantly varying loads. The lower the slope of the viscosity/temperature curve, plotted as the log-log of viscosity, the more favorable is the temperature susceptibility characteristic of the asphalt cement.

Through oxidation on prolonged exposure to the environment and traffic, asphalt cements harden with age. Age hardening is another characteristic of asphaltic concrete to which close attention must be paid. The lower the slope of the viscosity/time curve, plotted as the log-log of viscosity, the more favorable are the age hardening characteristics of the asphalt.

In addition, it is important that the asphalt cement, laid as asphaltic concrete, display favorable durability properties when exposed to normal weathering and aging. Durability is the quality of resisting disintegration over time under prevailing conditions of weather and traffic. Repeated freezing and thawing, as well as oxidation attending the aging process, are factors affecting durability.

It is apparent that an asphalt cement would move qualitatively toward the ideal if the lowest AC grading consistent with low temperature considerations of brittleness and cracking could be incorporated without the sacrifice of the high temperature characteristics of the more viscous higher AC grades. Unfortunately, mixing of AC grades in present hot-mix asphalt processes, while technically feasible, inevitably results in unsatisfactory compromises of properties. For example, blending of stated grades of asphalt does not preserve in the blend the desirable temperature-dependent viscosities of each grade; rather, the blended product has viscosity characteristics that are intermediate between the original values.

Similarly, the application of roofing asphalt cements to roof construction raises considerations of temperature susceptibility and age hardening. Built-up roofing coats of asphalt materials account for the majority of commercial and industrial roofing in the United States. Built-up roofing involves the laydown of alternate layers of asphalt and asphalt-impregnated mats in which asphalt is applied hot as roofing asphalt cement.

Specialty asphalt applications, which include joint and crack fillers, recycling agents, waterproofing and dampproofing (ASTM D449), also are concerned with temperature susceptibility and age hardening in determining the ultimate performance of the products involved It is, therefore, among the objectives of this invention (1) to provide a gelled asphalt cement having improved properties over conventional asphalt cement, including reduced temperature susceptibility and lower rate of age hardening, and (2) to achieve these results with conventional hot-mix asphalt processes in existing hot-mix equipment, standard roofing application equipment and specialty asphalt application equipment.

SUMMARY OF THE INVENTION

In the practice of this invention, a novel multigrade asphalt cement is produced by gelling a liquefied asphalt material. This is accomplished by saponifying in the liquefied asphalt, substantially free of water, at least one fatty acid and at least one resin acid with an alkali metal base, or by adding the already saponified product to the liquefied asphalt, as further described below. The resulting gelled asphalt cement is utilized in conventional processes in road, roofing and specialty applications.

DETAILED DESCRIPTION

Figure 1:
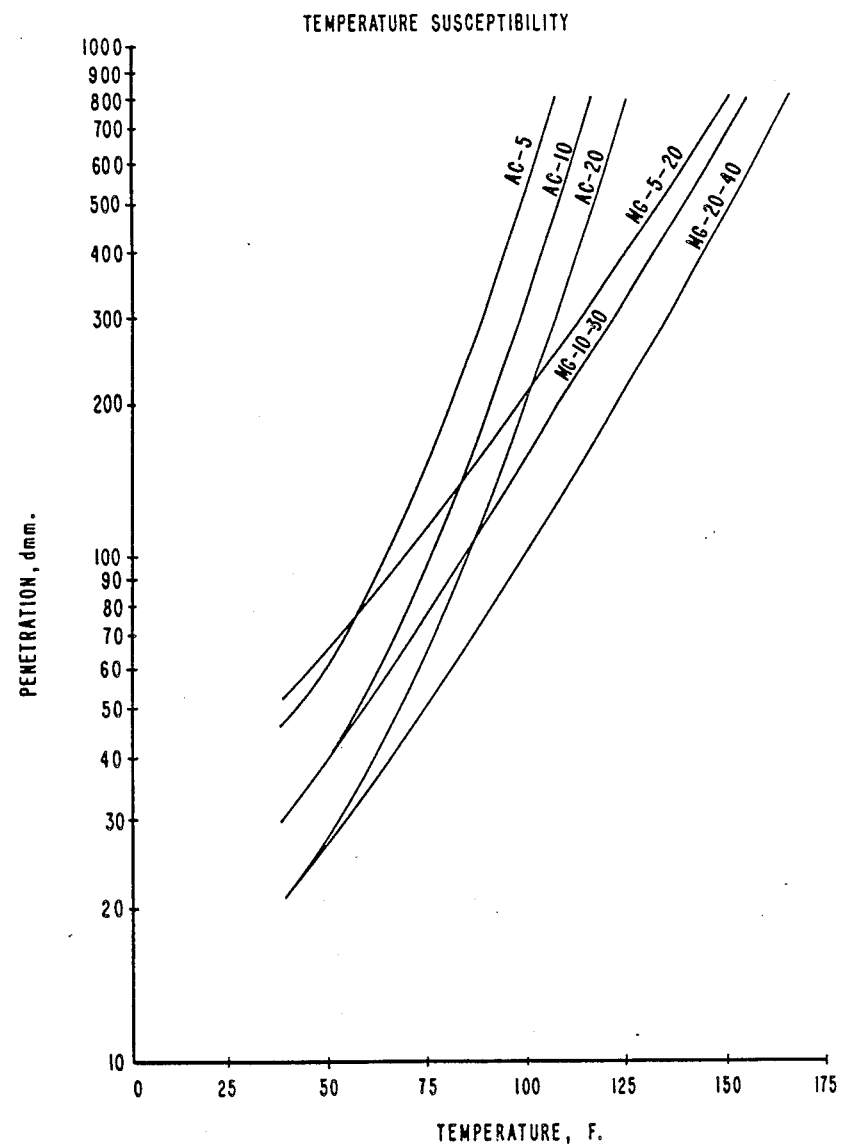

Conventional asphalt cement at elevated temperatures used in the hot-mix processes has the rheological properties of a liquid. The asphalt remains a liquid, flowable in accord with its particular viscosity-temperature relationship, throughout its incorporation with aggregate and its laydown as asphaltic concrete. In this physical state it is susceptible to flowing off the aggregate, depending on such factors as temperature, nature and surface area of the aggregate and the size and configuration of voids.

It has now been discovered that asphalt can be gelled by a direct saponification reaction requiring only a trace amount of an ionizing liquid to form an ionizing zone within the liquefied asphalt where the saponification reaction can begin. Water produced as the reaction proceeds is sufficient to sustain a reaction that permeates the entire mix containing the asphalt and saponification ingredients. The water is removed as part of this process.

Because of the qualitative advantages of gelled multigrade asphalt prepared according to this invention, asphalt of a lower AC grade (lower viscosity) may be selected to yield an asphaltic concrete having the low-temperature characteristics of that grade while displaying high-temperature characteristics of higher grade (i.e., higher viscosity) asphalt. In effect, these asphalt cements permit a greater flattening of the viscosity/temperature curve than is obtained with any single grade or mixture of grades. Similarly, improved age-hardening properties and a greater flattening of the viscosity/time curve is observed.

Accordingly, the term "multigrade" asphalt as used herein is adopted to describe a novel gelled asphalt cement having reduced temperature susceptibility and improved age hardening properties as compared with conventional asphalt cement. Multigrade asphalt cement is made by the novel process described below and is further characterized by being essentially water-free, as indicated by its property of being storable at about 220° F. or higher without foaming. It is suitable for mixing with aggregate to produce asphaltic concrete by conventional hot-mix methods, as well as being suitable for conventional roofing and specialty applications.

In the process of this invention, a gelled, essentially water-free multigrade asphalt cement is produced by gelling a liquefied asphalt material, substantially free of water, by saponifying therein at least one fatty acid and at least one resin acid by reaction with an alkali metal base in finely-divided, substantially dry particulate form, followed by removal of the water of reaction from the reacted mixture. The water normally associated with the reaction ingredients is usually sufficient to initiate the saponification reaction without causing such an accelerated rate of reaction as to produce undue foaming of the water of reaction as it escapes from the reacting mixture.

The asphalt material may be derived from any asphalt source, such as natural asphalt, rock asphalt or, preferably, petroleum asphalt obtained in the process of refining petroleum. The asphalt may be selected from those currently graded by AASHTO and ASTM, or it may be a blend of various asphalts not meeting any specific grade definition. This includes air-blown asphalt, vacuum-distilled asphalt, steam-distilled asphalt, cutback asphalt or roofing asphalt. Asphalt additives, such as antistrip or polymers, may be incorporated in the asphalt. Preferably, multigrade asphalt of this invention utilizes a soft grade, such as AC-5, where paving grade asphalt is desired. Alternatively, gilsonite, natural or synthetic, used alone or mixed with petroleum asphalt, may be selected. Synthetic asphalt mixtures suitable for use in the present invention are described, for example, in U.S. Pat. No. 4,437,896.

The liquefied asphalt material containing the saponification ingredients is passed through a high-shear mill to reduce the particle size of the alkali metal base and to disperse the base and organic acid components throughout the liquefied asphalt in order to facilitate the saponification reaction. The high shear mill should be of a type that will reduce the particle size of the base material to below about 425 microns.

Alternatively, gelled asphalt cement can be produced by adding the preformed soap to the liquefied asphalt. Since preformed soap, essentially free of the water of reaction, is relatively hard, it is preferably milled or melted prior to adding to the liquefied asphalt. The choice between in situ and external saponification requires balancing of several factors. Although an in situ reaction produces undesired water in the liquefied asphalt, the water readily evaporates at the prevailing temperatures. An external reaction requires extra steps and additional equipment for reaction, storage, milling (where the saponification product is kept as a solid soap) and transfer. Melting the soap introduces criticality of temperature control and use of temperatures generally higher than the liquefied asphalt. It is, therefore, preferred to conduct the saponification reaction in situ.

The asphalt material, preferably petroleum asphalt, is heated to yield a freely-flowable liquid or to a slightly higher temperature to facilitate evaporation of the water of the saponification reaction. Temperatures of about 350° F. to about 450° F. may be employed, a temperature of about 400° F. being preferred.

The alkali metal base may be an alkali metal, alkali metal oxide, alkali metal hydroxide or alkali metal salt, such as metallic sodium, sodium oxide, sodium carbonate or the preferred sodium hydroxide, or it may be the corresponding potassium or lithium compounds. Preferably, the base should be substantially dry and in finely-divided particulate form when added.

The saponifiable organic acids (including, for present purposes, esters thereof) may be one or more saturated or unsaturated branched or straight chain fatty acids containing from about 12 to about 24 carbon atoms. Examples are stearic, oleic, linoleic, linolenic and organic sulfonic acids). The resin acids may be, for example, abietic acid, neo-abietic acid, dihydroxyabietic acid, palustric acid or isodextropimaric acid or mixtures thereof.

The organic acid component is preferably and conveniently added in the form of tall oil. Tall oil is the liquid resinous material obtained in the digestion of wood pulp from paper manufacture. Commercial tall oil generally comprises a complex of fatty acids, principally acids having 18 carbon atoms, resin acids and unsaponifiables, including sterols, higher alcohols, waxes and hydrocarbons. Tall oil will vary in the proportion of these constituents depending on a number of factors, including the geographic location of the trees furnishing the wood pulp. Preferably, unsaponifiable matter in the tall oil should be less than about 30 percent (ASTM D803). The ratio of fatty acid to resin acid should be between about 0.7 and about 2, preferably about 1:1. Where crude tall oil is used, about 2 percent by weight of asphalt is preferred for reaction with at least a stoichiometric amount of alkali metal base. If refined tall oils or individual fatty acids from non-tall oil sources are selected, or if the fatty acids are blended with resin acids in a synthetic tall oil, the quantities should approximate the acid components of crude tall oil. Generally, complete neutralization of the alkali metal base with the tall oil is preferred, indicating approximately equimolar amounts of acid and base.

To initiate the saponification reaction, only an extremely small amount of ionizing medium, such as water, need be present. For example, water normally present as moisture on the surface of a hygroscopic base, such as substantially dry sodium hydroxide reactant, is usually sufficient. Similarly, water normally present in commercially available crude tall oil is more than adequate to start the reaction. Where a base is selected that has in association one or more molecules of water of hydration, such as hydrated lithium hydroxide, the heat of the liquefied asphalt will release sufficient water to initiate the reaction.

Where the total reaction system contains no water or other ionizing medium (as, for example, where a dry, non-hygroscopic base and a water-free refined tall oil are used), adding a small amount of water to the liquefied asphalt will start the reaction. It is important, of course, that such addition be at a point where the water will be incorporated in the liquefied asphalt before being evaporated. Injection at or close to the throat of the mill will usually suffice. As a rough guide, water in an amount of less than about 0.001 weight percent based on asphalt has been found adequate. Indeed, in practice the saponification reaction has proceeded with an amount of water not measurable by standard techniques.

Regardless of the source of the ionizing medium, the intimate mixing achieved in the milling step is usually sufficient to achieve the desired distribution before evaporation occurs. Of course, as water of reaction is formed, an abundance of "ionizing medium" is present, and at that point evaporation is desired to produce an essentially dry asphalt cement.

Small amounts of an alcohol, such as methyl alcohol and other lower aliphatic alcohols, may be used similarly as the ionizing medium. The alcoholate formed by reaction with an alkali metal hydroxide facilitates the saponification reaction in the same manner, yielding water as the reaction proceeds. U.S. Pat. No. 2,385,817 describes the expediting quality of alcoholates in saponifying liquid hydrocarbons, such as gasolines. In general, the use of alcohol is to be avoided as a complication of the process, requiring the storage and handling of yet another ingredient.

The following examples illustrate the practice of this invention:

EXAMPLE 1

To a one-gallon heated and insulated cone-bottom vessel was added 1500 g of AC-20 asphalt cement preheated to 400° F. The bottom of the cone was valved to allow the asphalt to pass through a high shear colloid mill and to be returned to the top of the vessel. The asphalt was circulated through the mill as 3.7 g of sodium hydroxide beads was added to the circulating asphalt. The beads had been protected from moisture to avoid introduction of undesired water. Circulation of the mixture was continued for approximately two minutes until samples withdrawn passe through a No. 40 mesh (425 microns) screen. Crude tall oil, 30 g, was added to the circulating mixture. The ensuing reaction produced one mole of water for each mole of organic acid in the crude tall oil, the water disappearing as foam with continued heating and mixing. As the reaction proceeded, the mixture increased in viscosity. Mixing was continued until no further foaming was observed, indicating a completed reaction, in about 15 minutes from addition of the tall oil. Samples were withdrawn for testing.

Figure 2:
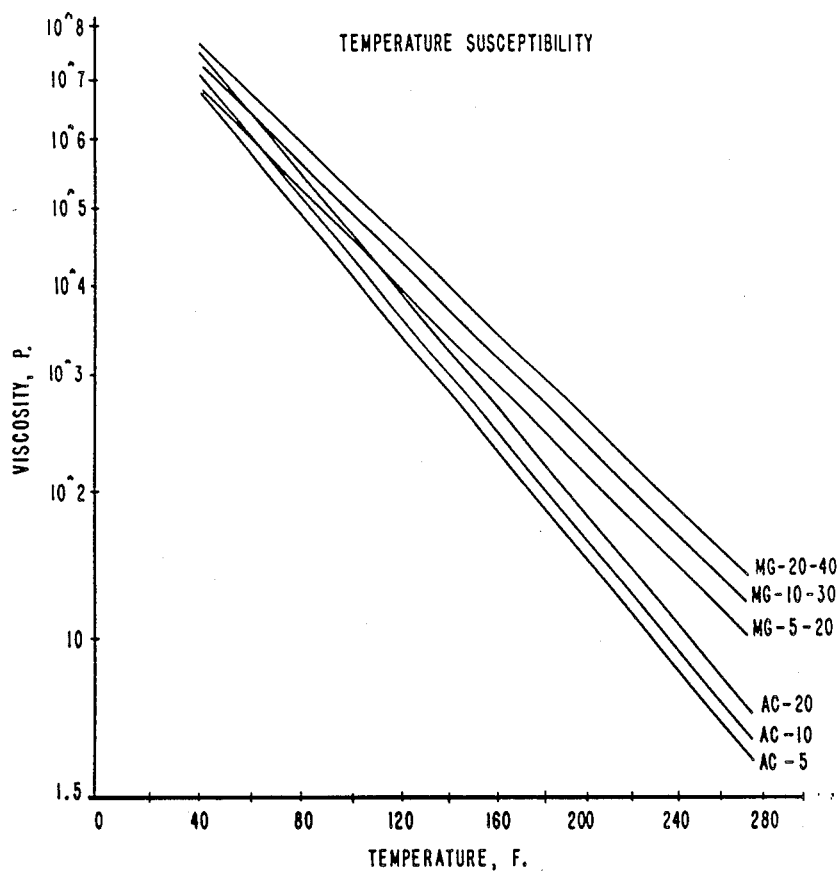
Figure 3:
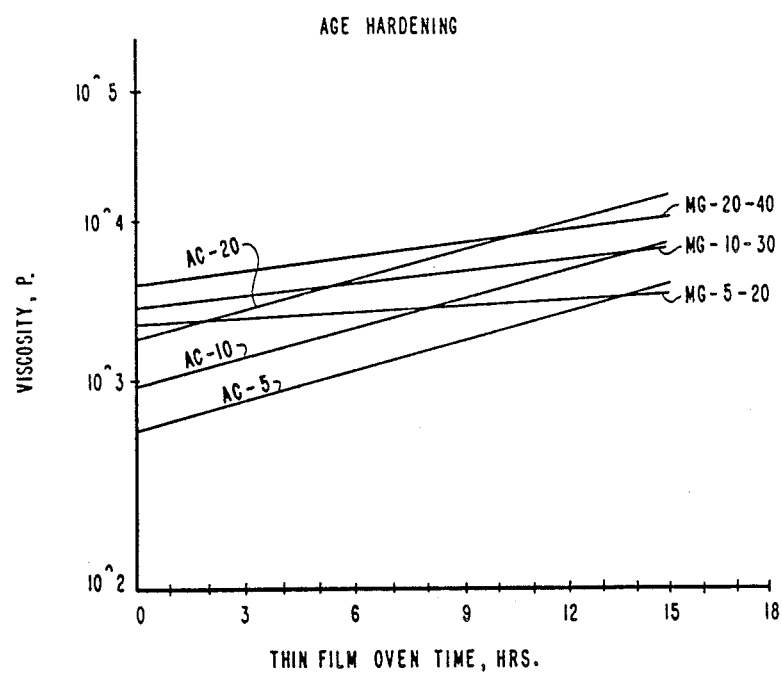

Results of various tests are given in Table 1 and FIGS. 1–3, together with test results obtained on samples of the asphalt cement before being subjected to multigrade treatment by the above procedure.

EXAMPLE 2

Following the procedure of Example 1, AC-5 asphalt cement was substituted for the AC-20 asphalt cement of Example 1. The physical properties of the resulting asphalt cement are given in Table 1 and FIGS. 1–3 and are compared with properties obtained by testing the same asphalt cement before being subjected to the multigrade treatment of Example 1.

EXAMPLE 3

Following the procedure of Example 1, AC-10 asphalt cement was substituted for the AC-20 asphalt cement of Example 1. The physical properties of the resulting asphalt cement are given in Table 1 and FIGS. 1–3 and compared with properties obtained by testing the same asphalt cement before being subjected to the multigrade treatment of Example 1.

The multigrade gelled asphalts for descriptive purposes in Table 1 and FIGS. 1–3 are listed by both the conventional asphalt grade and the equivalent grade, in terms of viscosity at 140° F., to which these grades were converted by multigrade treatment. For example, MG-5-20 indicates a multigrade asphalt, made from an AC-5 asphalt, displaying viscosity characteristics of an AC-20 asphalt at 140° F.

TABLE 1

| | BEFORE TREATMENT | | | | AFTER MULTIGRADE TREATMENT | | |
|---|---|---|---|---|---|---|---|
| | | | | | (MG-20-40) | (MG-10-30) | (MG-5-20) |
| | AC-40 | AC-20 | AC-10 | AC-5 | AC-20 | AC-10 | AC-5 |
| Penetration @ 39° F., 200 g, 60 sec., dmm. | 16 | 21 | 31 | 47 | 21 | 31 | 53 |
| Penetration @ 77° F., dmm. | 44 | 72 | 111 | 172 | 52 | 84 | 131 |
| Viscosity @ 39° F., 0.1 sec. −1, P. × $10^6$ | 160 | 62 | 22 | 15 | 80 | 54 | 30 |
| Viscosity @ 140° F., 1 sec. −1, P. | 3,500 | 1,820 | 910 | 530 | 3,950 | 2,980 | 2,200 |
| Viscosity @ 275° F., 10 sec. −1, P. | 4.7 | 3.7 | 2.50 | 2.20 | 19 | 14 | 6.50 |
| Softening Point, °F. | 135 | 124 | 117 | 111 | 165 | 153 | 150 |
| Penetration Index (PI) | +0.1 | +0.3 | +0.4 | +0.1 | +3.5 | +5.8 | +5.4 |
| Pen - Viscosity Number (PVN) | −0.89 | −0.68 | −0.84 | −0.47 | +1.29 | +1.58 | +1.09 |
| Viscosity After 5 Hours TFOT | 6,400 | 3,800 | 1,750 | 1,150 | 6,300 | 4,200 | 2,400 |
| Aging Index | 1.83 | 2.08 | 1.93 | 2.17 | 1.59 | 1.41 | 1.09 |
| Viscosity After 15 Hours TFOT | 26,000 | 16,700 | 6,770 | 3,900 | 1,200 | 4,800 | 3,300 |
| Aging Index | 7.43 | 9.18 | 7.44 | 7.34 | 3.30 | 1.40 | 1.50 |
| Viscosity After Rolling TFOT | 8,900 | 4,390 | 2,100 | 1,110 | 5,300 | 4,310 | 3,800 |
| Aging Index | 2.54 | 2.41 | 2.31 | 2.09 | 1.34 | 1.45 | 1.73 |

The results presented in Table 1 afford a direct comparison of various properties of the indicated asphalt cement grades before (representing a conventional hot-mix asphalt cement) and after multigrade treatment. The tests included two widely used procedures for determining temperature susceptibility of the asphalt.

The first procedure is the penetration index (PI) developed by Pfeiffer & VanDoormal, reported in *Journal of Institute of Petroleum Techologists*, 12:414 (1936). This procedure assumes a value of zero for typical road bitumens. Values above zero are less temperature susceptible, and values below zero are more temperature susceptible, than normal asphalt cements. Table 1 shows that PI has been substantially improved by multigrade treatment for all asphalt grades tested.

The second procedure is the Pen-Viscosity Number (PVN) developed by McLeod, reported at *Proceedings of Asphalt Paving Technologists*, 41:424 (1972). PVN utilizes the high temperature viscosity of the asphalt as well as the penetration in comparison with PVN index values of good and poor asphalts. Again, a value above zero indicates an asphalt less temperature susceptible than does a value below zero. Table 1 shows that all asphalts tested were likewise substantially improved as to temperature susceptibility by multigrade treatment.

FIG. 1 indicates the relationship between penetration, which is a measure of viscosity, and temperature. The multigrade asphalts produce a flatter slope, which is indicative of lower temperature susceptibility.

Similarly, FIG. 2 graphically shows the flatter slope of the viscosity/temperature curve for asphalts improved by the multigrade process. Again, all the multigrade-treated asphalts have a flatter slope, indicating less temperature susceptibility than conventional, untreated asphalts.

Table 1 also shows the effects of the process of this invention on the age hardening property of the asphalts. The ASTM D1754 Test Method for Effect of Heat and Air on Asphaltic Materials (TFOT) was employed to characterize the age hardening rate of the asphalts. Also indicated is the age hardening rate obtained by dividing the viscosity of the asphalt after TFOT by the viscosity before TFOT. This ratio of viscosity after thin film oven to viscosity before thin film oven is called the aging index. Table 1 indicates substantial improvement of the asphalt on multigrade treatment in terms both of TFOT and the aging index.

The thin film oven test was extended to show the long-term effect of aging thin films of asphalt by increasing the aging time from 5 hours to 15 hours. Table 1 shows that the age hardening rate of the asphalt was substantially reduced by treatment as described in the examples.

substituted for the sodium hydroxide of Example 1. Test results are shown in Table 2.

EXAMPLE 5

Following the procedure of Example 4, 2.24 g of anhydrous lithium hydroxide was substituted for the potassium hydroxide of Example 4. Test results are shown in Table 2.

EXAMPLE 6

Following the procedure Example 4, 5 g of anhydrous sodium carbonate was substituted for the potassium hydroxide of Example 4. The results are shown in Table 2.

TABLE 2

|  | EXAMPLE 4 KOH | EXAMPLE 5 LiOH | EXAMPLE 6 $Na_2CO_3$ | AC-10 CONTROL |
|---|---|---|---|---|
| Penetration, dmm. | 75 | 87 | 70 | 90 |
| Viscosity @ 140° F., P. | 1,850 | 1,340 | 2,300 | 1,150 |
| Softening Point, °F. | 128 | 126 | 149 | 122 |
| Penetration Index (PI) | +0.8 | +0.6 | +2.9 | +0.2 |
| Viscosity After (TFOT) 5 hours, P. | 2,743 | 2,860 | 4,189 | 3,050 |
| Aging Index | 1.49 | 2.13 | 1.82 | 2.65 |
| Viscosity After (TFOT) 15 hours, P. | 5,600 | 8,174 | 6,417 | 11,400 |
| Aging Index | 3.03 | 6.1 | 2.79 | 9.91 |

FIG. 3 is a plot of viscosity change as a function of age hardening time in the thin film oven test. It is evident that the multigrade asphalts produce a lower slope of the viscosity/TFOT curve, indicating a lower rate of age hardening than conventional asphalts.

It should be noted that normal methods of measuring viscosity of asphalt cements, such as ASTM D2170 and ASTM D2171, do not apply to multigrade asphalts because the asphalt is non-Newtonian. Because of the non-Newtonian properties, ASTM P-160 (1984) Viscosity of Asphalt Emulsion Residues and Non-Newtonian Bitumens by Vacuum Capillary Viscometer is the preferred testing procedure. Results of various tests are given in Table 1, together with test results obtained on samples of the asphalt before being subjected to multigrade treatment by the above procedure.

It can be seen from the foregoing comparative tests that multigrade treatment significantly and advantageously affected the qualities of penetration, viscosity and viscosity after 5 and 15 hours TFOT aging. For example, the viscosity of AC-5 asphalt before treatment at 140° was 530 poises. Multigrade treatment of this same asphalt resulted in a viscosity increase to 2,200 poises, meeting the viscosity requirements of AASHTO M-226 of an AC-20 asphalt. Similarly and dramatically, the age hardening qualities of each of the asphalts were markedly improved by multigrade treatment.

EXAMPLE 4

Following the procedure of Example 1, 1500 g of AC-10 was substituted for the asphalt cement of Example 1, and 5.25 g of anhydrous potassium hydroxide was Table 2 shows that all asphalt cements were substantially improved in terms of temperature susceptibility based on penetration index and long-term aging index as compared with a control utilizing AC-10 as the base asphalt.

EXAMPLE 7

Following the procedure of Example 4, 2.2 g of sodium metal was substituted for the potassium hydroxide of Example 4. Less foam was observed. The results are shown in Table 3.

EXAMPLE 8

Following the procedure of Example 4, crude tall oil was added first to the asphalt cement, followed by mixing and addition of sodium hydroxide beads into the high shear colloid mill. The results are shown in Table 3.

This example demonstrates that the reverse order of chemical addition has no significant effect on the properties of the multigrade treated asphalt.

EXAMPLE 9

To the vessel of Example 1 were added, with thorough mixing, 500 g of crude tall oil heated to 300° F., followed by 62.5 g of sodium hydroxide beads. From the resulting mixture, 33.75 g was withdrawn and added to 1500 g of AC-10 asphalt maintained at 400° F. The resulting mixture was passed through a high shear colloid mill. The multigrade product was tested as before, and test results are shown in Table 3.

TABLE 3

|  | EXAMPLE 7 Sodium Metal | EXAMPLE 8 Tall Oil First | EXAMPLE 9 Tall Oil & Caustic Added Together | CONTROL AC-10 |
|---|---|---|---|---|
| Penetration | 68 | 67 | 72 | 90 |
| Viscosity @ 140° F., P. | 3,105 | 3,275 | 2,400 | 1,150 |
| Softening Point, °F. | 159 | 150 | 145 | 122 |
| Penetration Index (PI) | +3.8 | +2.9 | +2.5 | +0.2 |

TABLE 3-continued

|  | EXAMPLE 7 Sodium Metal | EXAMPLE 8 Tall Oil First | EXAMPLE 9 Tall Oil & Caustic Added Together | CONTROL AC-10 |
|---|---|---|---|---|
| Viscosity (ATFOT), 5 hours | 5,650 | 5,900 | 5,620 | 3,050 |
| Aging Index | 1.82 | 1.80 | 2.34 | 2.65 |
| Viscosity (ATFOT), 15 hours | 4,805 | 8,275 | 8,125 | 11,400 |
| Aging Index | 2.71 | 2.53 | 3.39 | 9.91 |

The foregoing results show the physical properties obtained on the multigrade asphalt products of Examples 7-9. The results show substantial improvement in temperature susceptibility and age hardening of the multigrade asphalt cement as compared with an AC-10 control regardless of the order of addition of ingredients.

EXAMPLE 10

Tests were conducted to demonstrate the sensitivity of asphalt emulsion residues containing high float residues to moisture remaining in the mixture. An ASTM No. 8 washed limestone was coated with 4 percent by weight multigrade asphalt cement made from AC-5 asphalt (yielding MG5-20 asphalt cement) and compared with similarly prepared conventional AC-20 asphalt (ASSHTO M-226). HFMS-2h asphalt emulsion (ASSHTO M-140) was also mixed with aggregate by adding 5.7 percent emulsion by weight to produce a 4 percent by weight residual asphalt mixture. Each batch of asphalt cement was mixed for 90 seconds with aggregate at 300° F. The aggregate was heated approximately 100° F. higher with the HFMS-2h asphalt emulsion to remove the water. The final mixture temperature in all cases was 275° F.

Approximately 300 g of each mix was placed in an oven at 300° F. for one hour in an 8-inch diameter No. 4 sieve. A pan was placed under each sieve to capture asphalt drainage. Results were as follows:

|  | MG 5-20 | AC-20 | HFMS-2h |
|---|---|---|---|
| Grams asphalt in pan | 0 | 9.9 | 1.3 |

These tests illustrate the resistance of multigrade asphalt to migration from the aggregate as compared with conventional AC-20 asphalt cement and high float, medium setting residues of asphalt emulsion. A special property of high float residues is said to be the reduced migration of asphalt in hot mixes. These tests indicate this to be true with respect to AC-20; but multigrade asphalt is decidedly superior in this regard to HFMS emulsion residues.

EXAMPLE 11

The properties of the mixtures of Example 10 were measured over a wide range of temperatures. The purpose of these tests was to determine if the improved properties of the multigrade asphalt cement would improve the properties of the asphalt aggregate mixture (the primary end use of the material).

The same asphalt used in the drainage study of Example 10 was used in the asphalt aggregate mixture study of this example. An ASTM No. 5 aggregate, a No. 8 aggregate and a fine-graded sand were mixed to meet a ¾-inch dense mixture (ASTM D-3515). The aggregate and asphalt were heated to 300° F. before mixing, except that the HFMS-2h was mixed with aggregate at 400° F. an HFMS-2h at 77° F. for 90 seconds. Each combined mixture had 4.5 percent asphalt content by weight. Each mixture was compacted at 75 blows Marshall compaction in accordance with ASTM D-1559. Four mixtures with each asphalt were made and tested at four temperatures: 140° F., 100° F., 77° F., and 40° F. This range of temperatures represents a broad range of pavement temperatures actually encountered. Stiffness was measured by the Marshall and Hveem apparatus in accordance with ASTM D-1559 and ASTM D-1560. Results are shown in Table 4.

TABLE 4

| Test/Temp. °F. | MG 5-20 | AC-20 | HFMS-2h Emulsion |
|---|---|---|---|
| Hveem |  |  |  |
| 140 | 56 | 55 | 20 |
| 100 | 55 | 63 | 27 |
| 77 | 55 | 66 | 33 |
| 40 | 79 | 87 | 56 |
| Marshall |  |  |  |
| 140 | 2,450 | 2,550 | 900 |
| 100 | 2,850 | 4,150 | 1,250 |
| 77 | 3,100 | 4,750 | 1,850 |
| 40 | 10,000 | 17,500 | 2,900 |

These results indicate that stiffness (i.e., stability) of the asphaltic concrete made from multigrade asphalt cement did not increase as much as conventional asphalt cement.

The results also indicate that the emulsion mixture (HFMS-2h) has excessively low stability at high temperatures, which can be attributed to incomplete cure (i.e., presence of residual moisture).

In examples 12-14, tests were conducted to demonstrate the minute amount of water necessary to initiate the saponification reaction in the process of making multigrade asphalt cement.

EXAMPLE 12

Fifteen hundred grams of AC-10 asphalt was heated to 400° F. and added to the same vessel used in Example 1. Sodium hydroxide, 3.75 g, was also preheated to a dry, molten state and added to the asphalt and milled for one minute. Tall oil was heated to 275° for two hours to completely dry it. Thirty grams of the dried tall oil was added to the asphalt and caustic soda mixture and milled for 15 minutes. Test results are shown in Table 5.

EXAMPLE 13

Following the procedure of Example 12, 2.2 g of sodium metal was used in place of sodium hydroxide. Test results are shown in Table 5.

EXAMPLE 14

Following the procedure of Example 13, 0.015 g of water was added to the tall oil and mixed before being added to the asphalt.

TABLE 5

|  | Example 12 (dry) | Example 13 (dry) | Example 14 (water) |
| --- | --- | --- | --- |
| Penetration @ 39° F. 200 g, 60 sec., dmm. | 31 | 31 | 31 |
| Penetration @ 77° F., 100 g 5 sec., dmm. | 83 | 111 | 85 |
| Viscosity @ 140° F., 1 sec. −1, P. | 3,075 | 920 | 2,750 |
| Softening Point, °F. | 158 | 117 | 149 |
| Penetration Index (PI) | +4.3 | +0.7 | +3.8 |
| Viscosity After Five Hours TFOT, P. | 4,250 | 1,785 | 4,010 |
| Aging Index | 1.38 | 1.92 | 1.45 |
| Viscosity After Fifteen Hours TFOT, P. | 4,975 | 6,820 | 6,795 |
| Aging Index | 1.62 | 7.41 | 2.47 |

The results indicate that the saponification reaction proceeded in Examples 12 and 14, in which comparable properties were observed in the asphalt cement. The reaction occurred in Example 12, where all reactants were specially dried. Nevertheless, sufficient moisture (below the laboratory's capability to measure) was in the system to start the reaction.

No reaction took place in Example 13, despite following the same procedures of drying the tall oil. Here, metallic sodium replaced the dry, molten sodium hydroxide of Example 12.

Again using metallic sodium and dry tall oil, but also adding a small amount of water (0.001% by weight of asphalt) to the mixture, the saponification reaction took place, as shown in Example 14.

EXAMPLE 15

Following the procedure of Example 1, TYPE I Roofing Asphalt (ASTM D312) was used in place of AC-20. In Table 6, the test results are compared to the base asphalt in terms of typical roofing tests.

TABLE 6

|  | Before Treatment TYPE I | After Treatment (MG-TYPE-I-II) TYPE I | ASTM D312 TYPE II SPECIFICATION |
| --- | --- | --- | --- |
| Softening Point, °F. | 146 | 171 | 158 to 176 |
| Penetration @ 32° F., 200 g, 60 sec., dmm. | 14 | 14 | 6+ |
| Penetration @ 77° F., 100 g, 5 sec., dmm. | 40 | 34 | 18 to 40 |
| Penetration @ 115° F., 50 g, 5 sec., dmm. | 102 | 70 | 100− |
| Penetration Index, PI | −2.2 | 0 |  |

The tests indicate that the treated asphalt has low-temperature properties of a TYPE I roofing asphalt and the high-temperature properties of a TYPE II roofing asphalt. The PI also is substantially lower in the treated asphalt, indicating less temperature susceptibility.

What is claimed is:

1. A process for producing gelled multigrade asphalt cement comprising:
   a. liquefying an asphalt material that is substantially dry,
   b. saponifying therein at least one fatty acid and at least one resin acid by reacting with at least a saponifiable amount of a substantially dry alkali metal base, and
   c. removing the water of reaction to produce gelled multigrade asphalt cement.

2. The process of claim 1 in which the asphalt material is petroleum asphalt.

3. The process of claim 2 in which the asphalt material is AC-1, AC-2.5, AC-5, AC-10, AC-20, AC-30, AC-40, AC-50, or mixtures thereof, or Type I, II or III roofing asphalts or mixtures thereof.

4. The process of claim 1 in which the fatty acids and resin acids are added as tall oil.

5. The process of claim 1 in which the alkali metal base is an alkali metal hydroxide.

6. The process of claim 5 in which the alkali metal base is sodium hydroxide.

7. A process for producing multigrade asphalt cement as a gel comprising:
   a. heating to liquefy a petroleum asphalt, substantially free of water,
   b. adding thereto an alkali-metal hydroxide in substantially dry, finely-divided particulate form,
   c. shear-milling the resulting mixture to reduce particle size of the alkali metal hydroxide particulate and to disperse said particulate in the petroleum asphalt,
   d. adding thereto, with mixing, a saponifiable amount of tall oil to produce a gelled multigrade asphalt cement, the reaction system containing a small but sufficient amount of water to initiate the saponification reaction without causing substantial foaming, and
   e. removing the water of reaction from said asphalt gel to produce gelled multigrade asphalt cement.

8. The process of claim 7 in which the petroleum asphalt is AC-1, AC-2.5, AC-5, AC-10, AC-20, AC-30, AC-40, AC-50 or mixtures thereof.

9. A process for producing multigrade asphalt cement as a gel comprising:
   a. adding to a liquefied petroleum asphalt, substantially free of water, an alkali metal hydroxide in substantially dry, finely-divided particulate form,
   b. shear milling the resulting mixture to reduce particle size of the alkali metal hydroxide particulate and to disperse said particulate in the petroleum asphalt,
   c. mixing therewith at least one fatty acid and at least one resin acid in a ratio of about 0.7 to about 2 and in a total amount approximately neutralizable by said alkali metal hydroxide, in the presence of an amount of water sufficient to initiate the saponification reaction without causing substantial foaming, and d. removing the water of reaction to produce gelled multigrade asphalt cement.

10. The process of claim 9 in which the fatty acid and resin acid are added as tall oil.

11. The process of claim 9 in which the alkali metal hydroxide is sodium hydroxide.

12. The process of claim 9 in which the tall oil and alkali metal hydroxide are premixed and added to the petroleum asphalt.

13. A method for paving with a asphalt material which comprises:
   a. gelling a liquefied asphalt material, substantially free of water, by saponifying therein at least one fatty acid and at least one resin acid by reaction with at least a saponifiable amount of a substantially dry alkali metal base,
   b. removing the water of reaction from said gel to produce gelled multigrade asphalt cement,
   c. mixing said gel with substantially water-free aggregate,
   d. distributing said gel-aggregate mixture over a surface to be paved, and
   e. compacting said distributed mixture to the desired density to produce a laydown of asphaltic concrete.

14. The process of claim 13 in which the asphalt material is petroleum asphalt.

15. The process of claim 14 in which the petroleum asphalt is AC-1, AC-2.5, AC-5, AC-10, AC-20, AC-30, AC-40, AC-50 or mixtures thereof.

16. The process of claim 13 in which the fatty acids and resin acids are added as tall oil.

17. The process of claim 13 in which the alkali metal base is an alkali metal hydroxide.

18. The process of claim 17 in which the alkali metal hydroxide is sodium hydroxide.

19. A method for paving with petroleum asphalt which comprises:
   a. heating to liquefy a petroleum asphalt, substantially free of water,
   b. adding thereto an alkali metal hydroxide in substantially dry, finely-divided particulate form,
   c. shear milling the resulting mixture to reduce particle size of the alkali metal hydroxide particulate and to disperse said particulate in the petroleum asphalt,
   d. adding thereto, with mixing, a saponifiable amount of tall oil to produce gelled multigrade asphalt cement, the reaction system containing a small but sufficient amount of water to initiate the saponification reaction without causing substantial foaming,
   e. mixing said gel with substantially water-free aggregate,
   f. distributing said gel-aggregate mixture over a surface to be paved, and
   g. compacting said distributed mixture to the desired density to produce a laydown of asphaltic concrete.

20. The process of claim 19 in which the petroleum asphalt is AC-1, AC-2.5, AC-10, AC-20, AC-30, AC-40, AC-50 or mixtures thereof.

21. A method for paving with petroleum asphalt which comprises:
   a. adding to a liquefied petroleum asphalt, substantially free of water, an alkali metal hydroxide in substantially dry, finely-divided, particulate form,
   b. shear-milling the resulting mixture to reduce particle size of the alkali metal hydroxide particulate and to disperse said particulate in the petroleum asphalt,
   c. mixing therewith at least one fatty acid and at least one resin acid in a ratio of about 0.7 to about 2 and in a total amount approximately neutralizable by said alkali metal hydroxide,
   d. removing the water of reaction to produce gelled multigrade asphalt cement, the reaction system containing a small but sufficient amount of an ionizing liquid to initiate the saponification reaction,
   e. mixing said gel with substantially water-free aggregate,
   f. distributing said gel-aggregate mixture over a surface to be paved, and
   g. compacting said distributed mixture to the desired density to produce a laydown of asphaltic concrete.

22. The process of claim 21 in which the fatty acid and resin acid are added as tall oil.

23. The process of claim 21 in which the alkali metal hydroxide is sodium hydroxide.

24. A method for roofing with an asphalt material which comprises:
   a. gelling a liquefied asphalt material, substantially free of water, by saponifying therein at least one fatty acid and at least one resin acid by reaction with at least a saponifiable amount of a substantially dry alkali metal base,
   b. removing the water of reaction to produce gelled multigrade asphalt cement,
   c. applying and rolling asphalt-saturated felts onto a roof surface, and
   d. distributing by mopping at least one layer of multigrade asphalt cement thereon to produce an asphalt roof.

25. The process of claim 24 in which the asphalt material is petroleum asphalt.

26. The process of claim 25 in which the petroleum asphalt is Type I, II or III roofing asphalts or mixtures thereof.

27. The process of claim 24 in which the fatty acids and resin acids are added as tall oil.

28. The process of claim 24 in which the alkali metal base is an alkali metal hydroxide.

29. The process of claim 28 in which the alkali metal hydroxide is sodium hydroxide.

30. A method for roofing with petroleum asphalt which comprises:
   a. heating to liquefy a petroleum asphalt, substantially free of water,
   b. adding thereto an alkali metal hydroxide in substantially dry, finely-divided particulate form,
   c. shear-milling the resulting mixture to reduce particle size of the alkali metal hydroxide particulate and to disperse said particulate in the petroleum asphalt,
   d. adding thereto, with mixing, a saponifiable amount of tall oil to produce gelled multigrade asphalt cement, the reaction system containing a small but sufficient amount of water to initiate the saponification reaction without causing substantial foaming,
   e. applying and rolling asphalt-saturated felts onto a roof surface, and
   f. distributing by mopping at least one layer of multigrade asphalt cement thereon to produce an asphalt roof.

31. The process of claim 30 in which the petroleum asphalt is Type I, II or III roofing asphalts or mixtures thereof.

32. A gelled asphalt cement produced by gelling liquefied asphalt substantially free of water.

33. A gelled asphalt cement produced by adding tall oil and at least a saponifiable amount of a substantially dry alkali metal hydroxide to liquefied asphalt substantially of water.

34. The process of claim 1 in which the ratio of fatty acids and resin acids is between about 0.7 and about 2.

35. The process of claim 1 in which the ratio of fatty acids and resin acids is about 1:1.

36. The process of claim 7 in which the tall oil contains fatty acids and resin acids in a ratio between about 0.7 and about 2.

37. The process of claim 7 in which the tall oil contains fatty acids and resin acids in a ratio of about 1:1.

38. The process of claim 9 in which the ratio of fatty acids and resin acids is about 1:1.

39. The process of claim 13 in which the ratio of fatty acids and resin acids is between about 0.7 and about 2.

40. The process of claim 13 in which the ratio of fatty acids and resin acids is about 1:1.

41. The process of claim 19 in which the tall oil contains fatty acids and resin acids in a ratio between about 0.7 and about 2.

42. The process of claim 19 in which the ratio of fatty acids and resin acids is about 1:1.

43. The process of claim 21 in which the ratio of fatty acids and resin acids is about 1:1.

44. The process of claim 24 in which the ratio of fatty acids and resin acids is between about 0.7 and about 2.

45. The process of claim 24 in which the ratio of fatty acids and resin acids is about 1:1.

46. The process of claim 30 in which the tall oil contains fatty acids and resin acids in a ratio between about 0.7 and about 2.

47. The process of claim 30 in which the tall oil contains fatty acids and resin acids in a ratio of about 1:1.

48. The product of claim 33 in which the tall oil contains fatty acids and resin acids in a ratio between about 0.7 and about 2.

49. The product of claim 33 in which the tall oil contains fatty acids and resin acids in a ratio of about 1:1.

* * * * *

UNITED STATES PATENT AND TRADEMARK OFFICE
CERTIFICATE OF CORRECTION

PATENT NO. : 4,874,432
DATED : October 17, 1989
INVENTOR(S) : Anthony J. Kriech; Herbert L. Wissel It is certified that error appears in the above—identified patent and that said Letters Patent is hereby corrected as shown below:

In Abstract, Line 12, change "prepapred" to "prepared".

In Column 2, Line 68, change "aver" to "paver".

In Column 4, Line 53, change "nd" to "and".

In Column 12, Line 11, change "procedure Example" to "procedure of Example"

In Column 15, Line 50, change "lower" to "higher".

In Column 17, Line 10, change "a asphalt" to "an asphalt".

In Column 19, Line 10, change "substantially of water" to "substantially free of water".

Signed and Sealed this

Thirty-first Day of March, 1992

Attest:

HARRY F. MANBECK, JR.

*Attesting Officer*     *Commissioner of Patents and Trademarks*